US010581602B2

(12) United States Patent
Wang et al.

(10) Patent No.: US 10,581,602 B2
(45) Date of Patent: Mar. 3, 2020

(54) END-TO-END CHECKSUM IN A MULTI-TENANT ENCRYPTION STORAGE SYSTEM

(71) Applicant: VMware, Inc., Palo Alto, CA (US)

(72) Inventors: Wenguang Wang, Santa Clara, CA (US); Xin Li, Fremont, CA (US); Haoran Zheng, San Jose, CA (US); Eric Knauft, San Francisco, CA (US); Jin Zhang, Fremont, CA (US); Pascal Renauld, Palo Alto, CA (US); Bryan Fink, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 219 days.

(21) Appl. No.: 15/866,185

(22) Filed: Jan. 9, 2018

(65) Prior Publication Data

US 2019/0215152 A1   Jul. 11, 2019

(51) Int. Cl.
  *H04L 29/06*   (2006.01)
  *H04L 9/08*    (2006.01)
  *G06F 21/64*   (2013.01)
  *H04L 29/08*   (2006.01)

(52) U.S. Cl.
  CPC .............. *H04L 9/088* (2013.01); *G06F 21/64* (2013.01); *H04L 9/0816* (2013.01); *H04L 9/0894* (2013.01); *H04L 67/1097* (2013.01); *H04L 2209/30* (2013.01)

(58) Field of Classification Search
  None
  See application file for complete search history.

(56) References Cited

U.S. PATENT DOCUMENTS

| | | | |
|---|---|---|---|
| 2014/0115245 A1* | 4/2014 | Maybee | G06F 12/0897 711/105 |
| 2015/0188949 A1* | 7/2015 | Mahaffey | H04L 63/20 726/1 |
| 2016/0277368 A1* | 9/2016 | Narayanaswamy | G06F 21/6218 |

* cited by examiner

*Primary Examiner* — Andrew J Steinle

(57) ABSTRACT

A multi-tenant storage system can store clear text data and associated clear text checksum received from a storage tenant using their associated cryptographic key ("cryptokey"). When the clear text data is compressible, cryptographic data ("cryptodata") is generated from a concatenation of the clear text checksum and compressed clear text data using the cryptokey. A cryptographic checksum ("cryptochecksum") is generated from the cryptodata. When the clear text data is uncompressible, cryptographic data ("cryptodata") is generated by encrypting the clear text data using the cryptokey with an extra verification step to make sure the clear text checksum can be rebuilt during the read request. A cryptographic checksum ("cryptochecksum") is generated from the cryptodata. The cryptodata and associated cryptochecksum are stored in the multi-tenant storage system, so that repairs to damaged cryptodata can be made using the associated cryptochecksum.

20 Claims, 13 Drawing Sheets

END-TO-END CHECKSUM IN A MULTI-TENANT ENCRYPTION STORAGE SYSTEM

CROSS REFERENCE TO RELATED APPLICATIONS

This application is related to concurrently filed U.S. application Ser. No. 15/866,278, filed Jan. 9, 2018, titled "Multi-Tenant Encryption on Distributed Storage Having Deduplication and Compression Capability," the content of which is incorporated herein by reference in its entirety for all purposes.

BACKGROUND

Multi-tenant storage refers to the idea of using a single storage platform (e.g., cloud storage) to serve multiple customers (storage tenants). A multi-tenant storage environment provides each storage tenant with their own cryptographic key to encrypt and decrypt their own data, allowing data from all the storage tenants to securely stored on the storage platform.

Providers of multi-tenant storage systems typically employ techniques that improve their storage efficiency. Data deduplication is one such technique in which the goal is to identify identical blocks of data so that only a single copy of such blocks of data are actually stored in the storage system. Data compression is another technique by which data is compressed so that they consume less disk space.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The multi-tenant storage system of the present disclosure provides for multi-tenant encryption while still allowing for data efficiency features such as deduplication and compression to be effective, and maintenance activities such as repairing degraded data, migrating data, decommission disks/hosts to go on. An advantageous aspect of multi-tenant storage systems according to the present disclosure is that maintenance activity can proceed absent the need for access to the storage tenants' cryptographic keys, which are usually managed in a key management server separate from the multi-tenant storage system. As such, the maintenance activity is not tied to the availability of the tenant key management server, which improves the availability and manageability in the multi-tenant storage system.

By comparison, conventional deduplication and compression activities typically occur prior to encryption of the tenant data with their respective cryptographic keys because encrypted data is typically uncompressible. Accordingly, encryption of the tenant data occurs just before storing the tenant data to physical storage. Subsequent maintenance on stored data, therefore, requires the data first be decrypted with the tenants' cryptographic keys. Since the tenants' cryptographic keys are typically stored on a key management server, the maintenance activity is tied to the availability of the key management server, which can adversely affect the ability to provide adequate maintenance of the data in the multi-tenant storage system.

Another advantageous aspect of multi-tenant storage systems according to the present disclosure is the preservation of end-to-end checksums. In accordance with some embodiments of the present disclosure, data can be stored using a checksum based on encrypted text (called cryptographic checksum below) that is separate from the clear text checksum provided by the tenant and is based on the text encrypted with the tenant's cryptographic key. The cryptographic checksum allows for detection and repair of data without needing to access the key management server, thus allowing maintenance activities such as detecting checksum failures and repairing degraded data without accessing tenant keys in the multi-tenant storage system.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
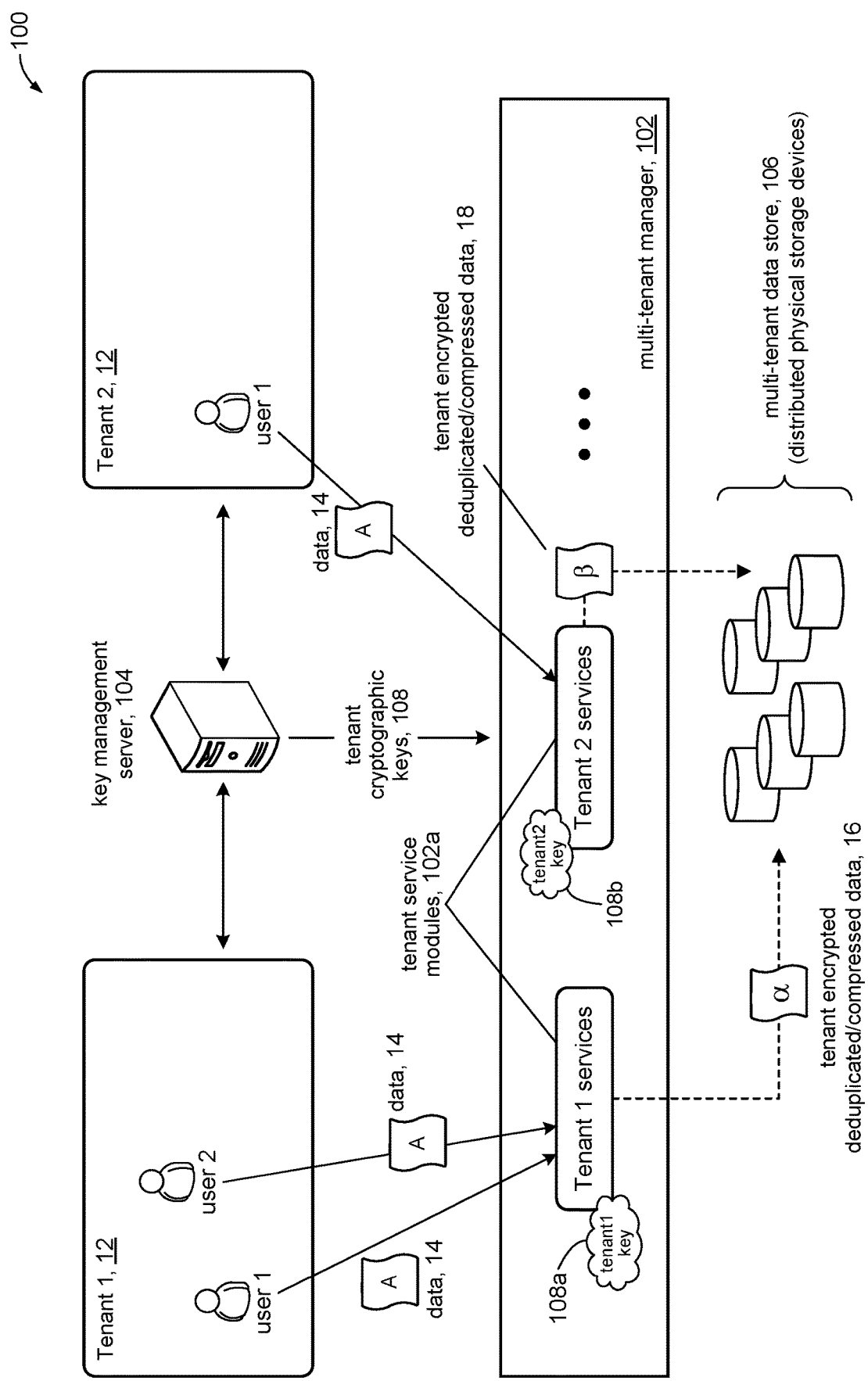
FIG. 1 is a system diagram for a multi-tenant storage system in accordance with the present disclosure.

FIG. 1 shows a multi-tenant storage system ("system") 100 in accordance with the present disclosure. In various embodiments, the system 100 can include a multi-tenant manager 102 to provide multi-tenant storage services for storage tenants 12 in the system 100. A storage tenant 12 can comprise a single user or a group of users (e.g., in an enterprise). In some embodiments, the multi-tenant manager 102 can comprise tenant services modules 102*a* to provide different services such as storage capacity, data throughput, backup capacity, reliability, etc. for different storage tenants 12. For example, a tenant services module 102*a* configured for Tenant 1 can provide a set of services that are different from the set of services provided by a tenant services module 102a configured for Tenant 2.

In some embodiments, the system 100 can include a key management server 104 to manage cryptographic keys 108a, 108b associated with the storage tenants 12. Each storage tenant 12 (e.g., Tenant 1, Tenant 2, etc.) is associated with a corresponding tenant cryptographic key 108 (e.g., 108a, 108b). When a new storage tenant is created or otherwise defined in the system 100, the key management server 104 can create and associate a cryptographic key specific to the new storage tenant.

The key management server 104 can serve cryptographic keys 108 to the multi-tenant manager 102 to support encryption and decryption when storing (writing) and accessing (reading) the storage tenants' data.

The system 100 can include a multi-tenant data store 106 to store tenant data. In various embodiments, the multi-tenant data store 106 can comprise a set of physical storage devices configured as a distributed storage system (e.g., a storage area network, network-attached storage, etc.), virtualized storage (e.g., redundant array of independent disks), and so on.

Briefly, when a user in a storage tenant 12 (e.g., user 1 of Tenant 1) sends data 14 to the multi-tenant manager 102 to be written, the multi-tenant manager 102 can obtain the cryptographic key (e.g., 108a) associated with that storage tenant to encrypt that data 14 from the key manager server 104 to produce tenant encrypted data (e.g., 16). Likewise, data 14 from a user of another storage tenant 12 (e.g., Tenant 2) will be encrypted using a cryptographic key (e.g., 108b) associated with that storage tenant.

In accordance with the present disclosure, the multi-tenant manager 102 can be configured to support data deduplication and data compression capabilities that operate in conjunction with multi-tenant encryption of tenant data to improve storage efficiency in the multi-tenant data store 106. For example, in FIG. 1 when users of the same storage tenant (e.g., Tenant 1) write the same data 14, the multi-tenant manager 102 can deduplicate the data 14 so that only a single copy (e.g., 16) of the data 14 is stored on the multi-tenant data store 106, thus reducing storage consumption by eliminating duplicate data. In addition, the multi-tenant manager 102 may perform data compression on the deduplicated data to further reduce storage consumption.

In various embodiments, the multi-tenant manager 102 does not deduplicate data across different storage tenants 12, in order to ensure separation of data among separate storage tenants 12 in the system 100. Thus, in FIG. 1 data 14 written by user 1 in Tenant 1 and the same data 14 written by user 1 in Tenant 2 will not be deduplicated. Rather, the multi-tenant manager 102 will store data 14 written by user 1 of Tenant 1 as encrypted deduplicated/compressed data 16 and store the same data 14 written by user 1 of Tenant 2 as encrypted deduplicated/compressed data 18.

Figure 2:
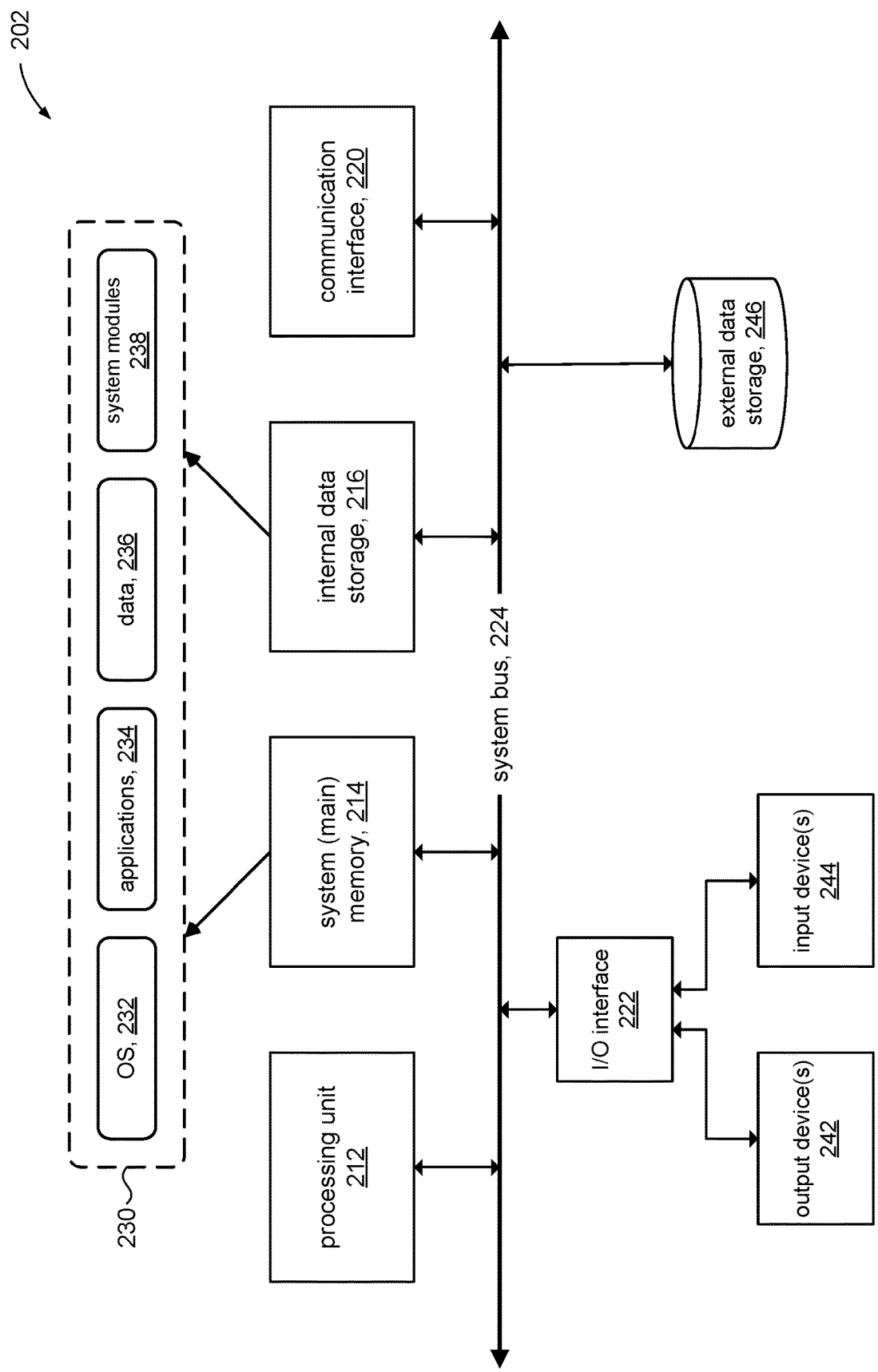
FIG. 2 is a computer system diagram in accordance with the present disclosure.

FIG. 2 is a simplified block diagram of an illustrative computing system 202 for implementing one or more of the embodiments described herein. In some embodiments, for example, the multi-tenant system 102 can comprise a plurality of computing systems 202 configured as host machines to support a system of virtual machines to service the storage tenants in the multi-tenant storage system 100.

The computing system 202 can be configured (e.g., via computer executable program code) to perform and/or be a means for performing, either alone or in combination with other elements, operations in accordance with the present disclosure. Computing system 202 can be configured to perform and/or be a means for performing any other steps, methods, or processes described herein. Computing system 202 can include any single or multi-processor computing device or system capable of executing computer-readable instructions. In a basic configuration, computing system 202 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 can receive computer-readable instructions from program and data modules 230. These instructions, when executed by processing unit 212, can cause processing unit 212 to perform operations in accordance with the present disclosure (e.g., via one or more instantiated virtual machines).

System memory 214 (sometimes referred to as main memory) can be any type or form of volatile or non-volatile storage device or medium capable of storing data and/or other computer-readable instructions. Examples of system memory 214 include, for example, random access memory (RAM), read only memory (ROM), flash memory, or any other suitable memory device. Although not required, in some embodiments computing system 202 can include both a volatile memory unit (such as, for example, system memory 214) and a non-volatile storage device (e.g., data storage 216, 246).

In some embodiments, computing system 202 can also include one or more components or elements in addition to processing unit 212 and system memory 214. For example, as illustrated in FIG. 2, computing system 202 can include internal data storage 216, a communication interface 220, and an I/O interface 222 interconnected via a system bus 224. System bus 224 can include any type or form of infrastructure capable of facilitating communication between one or more components comprising computing system 202. Examples of system bus 224 include a communication bus (such as an ISA, PCI, PCIe, or similar bus) and a network.

Internal data storage 216 can comprise non-transitory computer-readable storage media to provide nonvolatile storage of data, data structures, computer-executable instructions, and so forth to operate computing system 202 in accordance with various processes in accordance with the present disclosure disclosed herein. For instance, the internal data storage 216 can store various program and data modules 230, including for example, operating system 232, one or more application programs 234, program data 236, and other program/system modules 238.

Communication interface 220 can include any type or form of communication device or adapter capable of facilitating communication between computing system 202 and one or more additional devices. For example, in some embodiments communication interface 220 can facilitate communication between computing system 202 and a private or public network including external computing systems (e.g., storage tenants 12). Examples of communication interface 220 include, for example, a wired network interface (such as a network interface card), a wireless network interface (such as a wireless network interface card), a modem, and any other suitable interface.

In some embodiments, communication interface 220 can also represent a host adapter configured to facilitate communication between computing system 202 and one or more additional network or storage devices via an external bus or communications channel. Examples of host adapters include, for example, SCSI host adapters, USB host adapters, IEEE 1394 host adapters, PCI adapters, SATA and eSATA host adapters, ATA and PATA host adapters, Fibre Channel interface adapters, Ethernet adapters, or the like.

Computing system 202 can include at least one output device 242 (e.g., a display) coupled to system bus 224 via I/O interface 222. The output device 242 can include any type or form of device capable of visual and/or audio presentation of information received from I/O interface 222.

Computing system 202 can include at least one input device 244 coupled to system bus 224 via I/O interface 222. Input device 244 can include any type or form of input device capable of providing input, either computer or human generated, to computing system 202. Examples of input device 244 include a keyboard, a pointing device, a speech recognition device, or any other input device.

Computing system 202 can include external data storage 246 coupled to system bus 224. External data storage 246 can be any type or form of storage device or medium capable of storing data and/or other computer-readable instructions. For example, external data storage 246 can be a magnetic disk drive (e.g., a so-called hard drive), a solid state drive, an NVMe drive, a phase change memory or other non-volatile memory device, a floppy disk drive, a magnetic tape drive, an optical disk drive, a flash drive, or the like. In some embodiments, for example, external data storage 246 can represent the physical storage devices that constitute the multi-tenant data store 106.

Figure 3A:
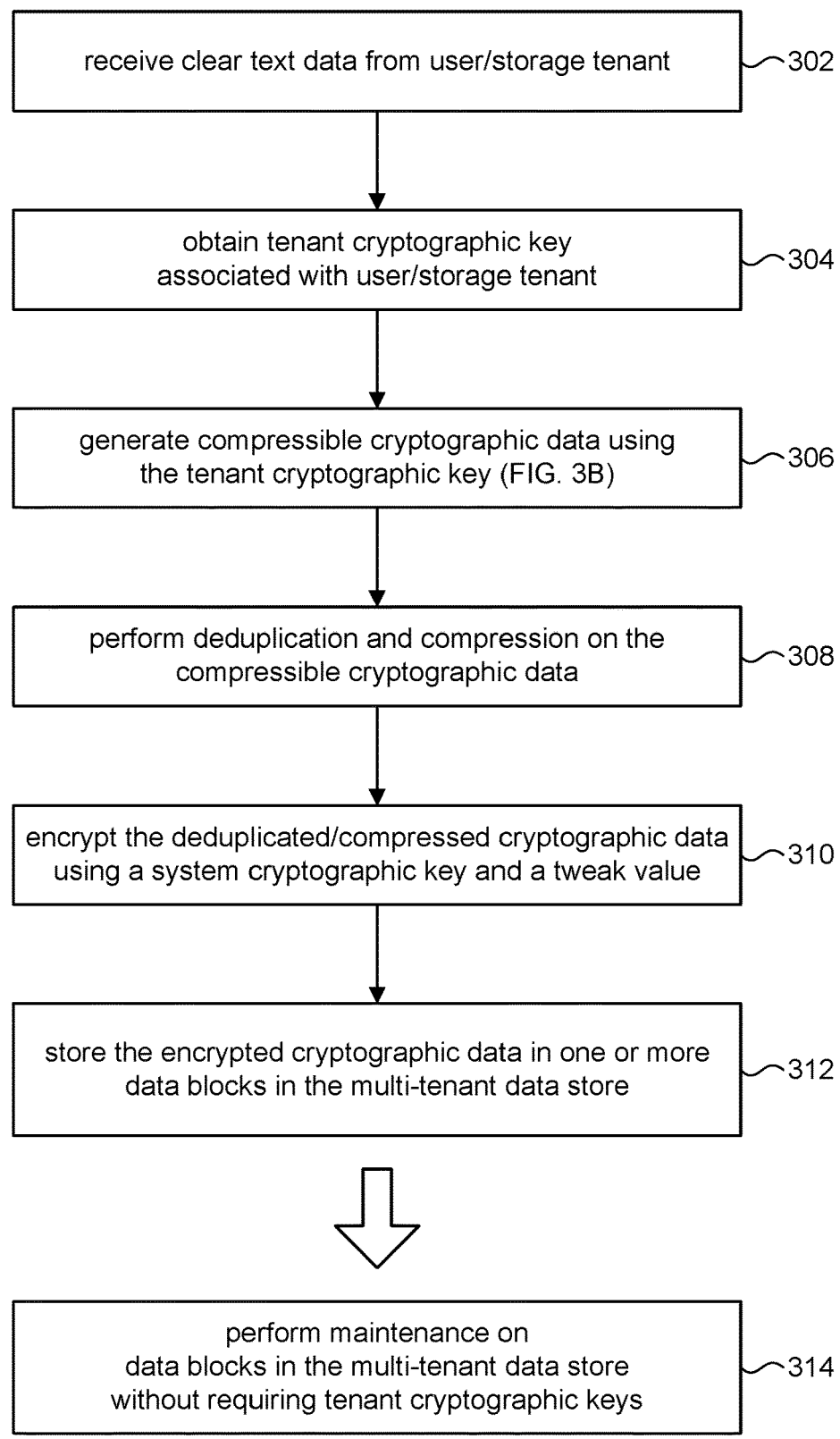
FIGS. 3A and 3B are process flows for writing data in a multi-tenant storage system in accordance with the present disclosure.

FIG. 3A shows an operational flow in the multi-tenant manager 102 in accordance with the present disclosure for storing multi-tenant data in a multi-tenant data store 106. In some embodiments, for example, the multi-tenant manager 102 can include computer executable program code, which when executed by one or more computer systems (e.g., 202, FIG. 2), can cause operations shown in FIG. 3A to be performed; for example, in a tenant service module 102a of the multi-tenant manager 102. The operations described below are not necessarily executed in the order shown, and can be allocated for execution among one or more concurrently executing processes and/or threads in a computer system, or among two or more computer systems.

At block 302, the multi-tenant manager 102 can receive a write request from a user/storage tenant 12 comprising data to be stored in the multi-tenant data store 106. The received data can be referred to herein as "clear text data."

At block 304, the multi-tenant manager 102 can obtain the tenant cryptographic key 108 that is associated with the user/storage tenant 12. In some embodiments, for example, the multi-tenant manager 102 can communicate with the key manager server 104 to obtain the tenant cryptographic key 108. For example, the multi-tenant manager 102 may use an identifier of the particular user/storage tenant 12 from the write request to obtain the tenant cryptographic key 108 from the key manager server 104.

At block 306, the multi-tenant manager 102 can generate compressible cryptographic data using the tenant cryptographic key 108 obtained at block 304. Details of this aspect of the present disclosure are described in FIG. 3B. With respect to the term "compressible" as used herein, data is compressible if a compression operation can be performed on the data that results in a reduction of the size of the data by a predetermined amount. Consider a block of data of size N, for example. In some embodiments, that block of data can be deemed compressible if the size of the resulting compressed data is a predetermined threshold percentage of N. In some embodiments, the value of N can be based on the size of the data blocks of the underlying physical storage devices that constitute the multi-tenant data store 106; e.g., data block sizes can be 4 KB, 512 B, or other sizes. In general, the size N of the data blocks can be any suitable value. In some embodiments, the threshold percentage can be set to 50%, and in general can be any other value. Merely to illustrate an example, suppose N is 4 KB and the threshold percentage is 50%. Then a block of data that compresses down to 3 KB is not deemed compressible, whereas a block of data that compress down to 2 KB or less is deemed compressible. The specific value of N and the specific threshold percentage will depend on the particulars of a given specific embodiment in accordance with the present disclosure.

At block 308, the multi-tenant manager 102 can perform deduplication and compression on the compressible cryptographic data generated at block 306. Briefly, data deduplication is a process by which a data storage system can detect multiple identical copies of data and only keep a single copy of that data, thus improving storage utilization by removing other copies of that data. Data deduplication can detect common blocks of data and maintain a single copy of those common blocks of data. The processing details for data deduplication are not relevant to the present disclosure and so will not be discussed herein, although various techniques for data deduplication are well known by persons having ordinary skill in the data storage arts. With respect to data compression, this is a process of modifying, encoding, or otherwise converting the bit structure of the data in such a way that it consumes less space on disk. Data compression enables reducing the storage size of one or more blocks of data. The processing details for data compression are not relevant to the present disclosure and so will not be discussed herein, although various techniques for data compression are well known by persons having ordinary skill in the data storage arts.

At block 310, the multi-tenant manager 102 can encrypt the deduplicated/compressed cryptographic data just before writing it to the multi-tenant data store 106. In accordance with the present disclosure, the multi-tenant manager 102 can perform the encryption using a system cryptographic key and a tweak value that can be maintained and managed by the multi-tenant manager 102. In some embodiments, the encryption can be performed in accordance with the Advanced Encryption Standard (AES), although it will be appreciated that any suitable encryption technique can be used. The tweak value can be based on the sector number of the data block in the physical storage devices of the multi-tenant data store 106 into which the encrypted cryptographic data will be stored. The tweak value ensures that no two blocks of data in the physical storage devices are encrypted using the same system cryptographic key. This is accomplished by "tweaking" (varying) the system cryptographic key on a per data block basis. In instances where the deduplicated/compressed cryptographic data spans multiple data blocks, the tenant manager 102 can partition the deduplicated/compressed cryptographic data, and encrypt each partition using the system cryptographic key and a tweak value that varies depending on where in the multi-tenant data store 106 the encrypted partition will be stored.

At block 312, the multi-tenant manager 102 can store the encrypted cryptographic data in one or more data blocks in the multi-tenant data store 106. For the purposes of the present disclosure, processing of the write request from the user/storage tenant can be deemed complete at this point.

At block 314, the multi-tenant manager 102 can perform subsequent maintenance activities on the data blocks in the multi-tenant data store 106. Maintenance activities can include deduplication and compression processing of data stored on the multi-tenant data store 106. Since the data is encrypted using the system cryptographic key and an appropriate tweak value just before writing the data to the multi-tenant data store 106 (block 310, FIG. 3A), that data can be decrypted in order to do maintenance such as repairing degraded data objects, absent access to any of the tenants' cryptographic keys in the key manager server 104 despite that the data is encrypted using the tenants' cryptographic keys. By comparison in a conventional multi-tenant data storage system, the data is encrypted using the storage tenant's cryptographic key just before being written, which means that subsequent data maintenance requires access to the key management server 104 in order to decrypt the data. Availability of the key management server 104 may not always coincide with the maintenance schedule, and so data maintenance in a system can be adversely impacted.

Figure 3B:
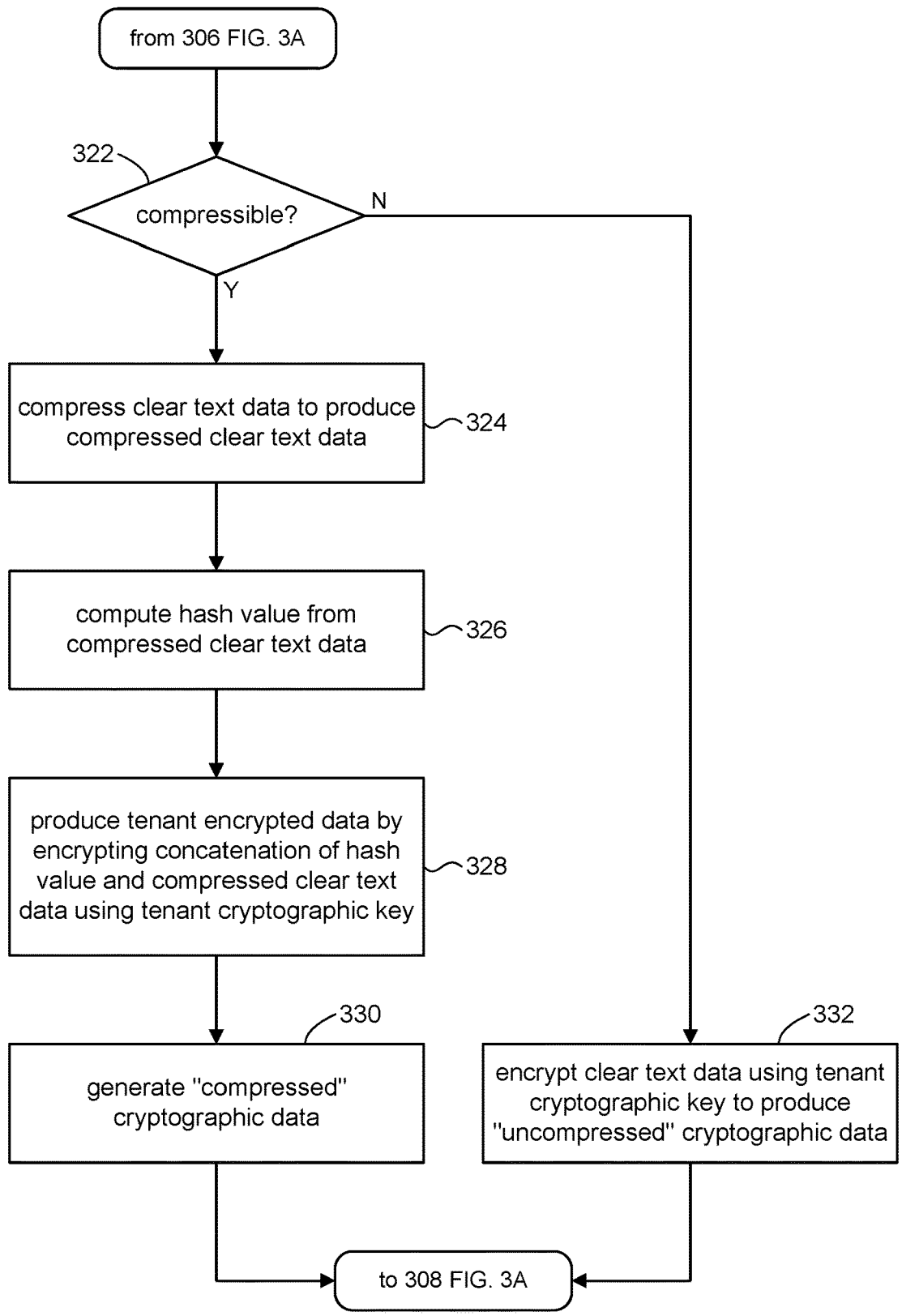
Figure 4:
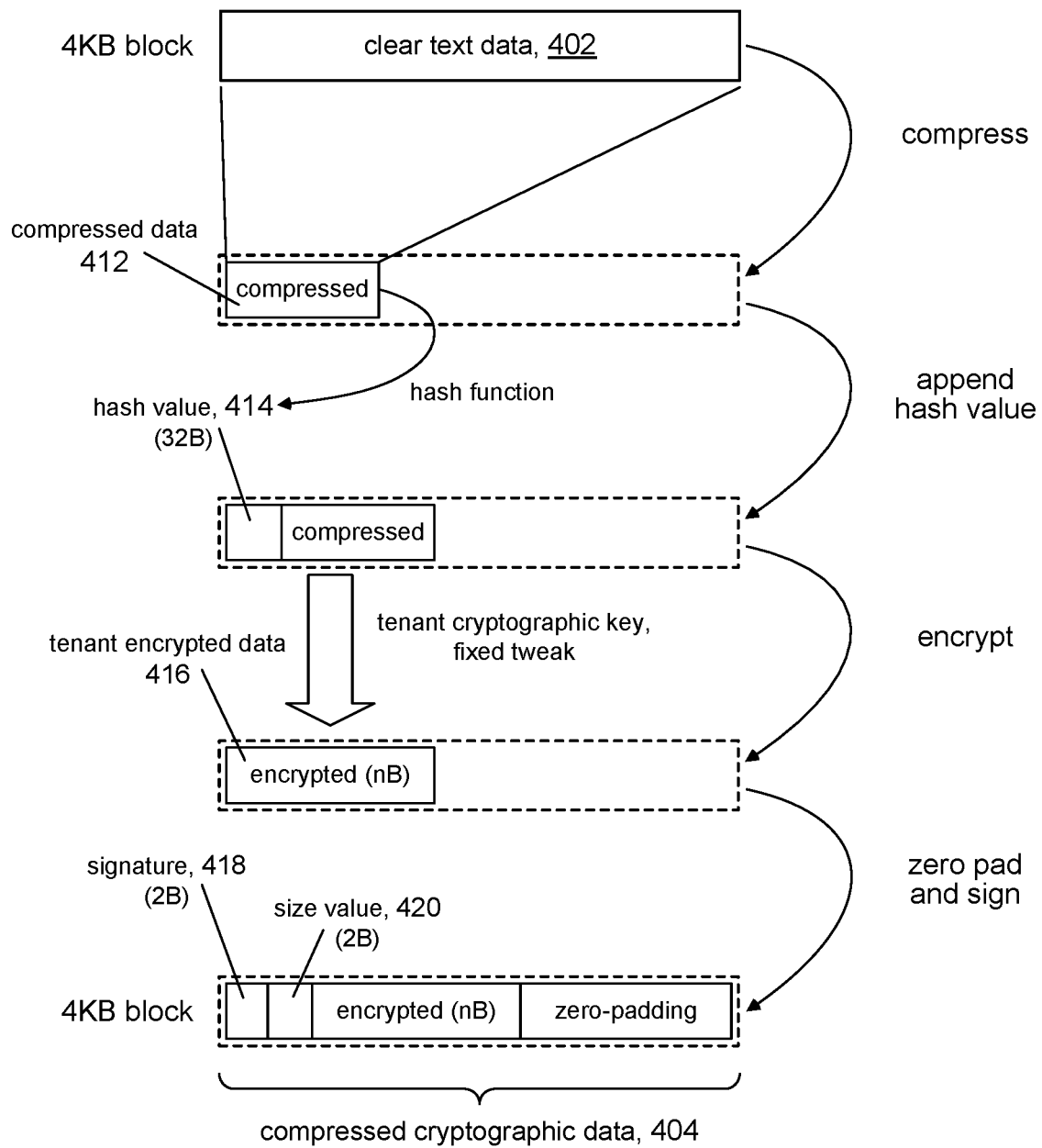
FIG. 4 shows some data manipulations in accordance with the process flows of FIGS. 3A and 3B.

Referring to FIGS. 3B and 4, the discussion will now continue with a description of the processing in block 306 to produce compressible cryptographic data using the storage tenant's cryptographic key. FIGS. 3B and 4 show an operational flow in the multi-tenant manager 102 in accordance with the present disclosure for storing multi-tenant data in a multi-tenant data store 106, and in particular details for generating the compressible cryptographic data. In some embodiments, the multi-tenant manager 102 can include computer executable program code, which when executed by one or more computer systems (e.g., 202, FIG. 2), can cause operations shown in FIG. 3B to be performed, for example, in a tenant service module 102a of the multi-tenant manager 102. FIG. 4 illustrates an example of the data that is involved in the processing. The operations described below are not necessarily executed in the order shown, and can be allocated for execution among one or more concurrently executing processes and/or threads in a computer system, or among two or more computer systems.

At block 322, the multi-tenant manager 102 can make a determination whether the clear text data received from the user/storage tenant (block 302, FIG. 3A) is compressible. As explained above, data can be deemed to be compressible if a compression operation can be performed on the data that reduces the size of the data by a predetermined amount. In general, any technique may be used to determine whether the clear text data is compressible. In some embodiments, for example, the determination can be made by running a predetermined compression algorithm on the clear text data. The clear text data can be deemed compressible if the size of the compressed clear text data is less than or equal to the quantity:

$$C - \text{HeaderSize},$$

where C is a threshold percentage of the size of the uncompressed clear text data (e.g., C can be 2 KB if the uncompressed size is 4 KB), HeaderSize is the combined data size (in bytes) of a hash value (e.g., 32 B), a signature (e.g., 2 B), and a size value (e.g., 2 B). These quantities are discussed below.

Processing can proceed to block 324 in response to a determination that the clear text data is compressible, and to block 332 otherwise.

At block 324, the multi-tenant manager 102 can produce compressed clear text data by running a predetermined compression algorithm on the clear text data (if not already done at block 322). The illustrative example in FIG. 4 depicts a 4 KB data block of clear text data 402 compressed down to a block of compressed clear text data 412.

At block 326, the multi-tenant manager 102 can compute a hash value 414 from the compressed clear text data using a suitable hashing algorithm. As indicated above, in some embodiments the hash value 414 can be a 32-byte datum.

At block 328, the multi-tenant manager 102 can produce tenant encrypted data 416. In some embodiments, for example, the multi-tenant manager 102 can append the hash value 414 to the compressed clear text data 412, as illustrated for example in FIG. 4. The multi-tenant manager 102 can then encrypt the concatenation of the hash value 414 and the compressed clear text data 412 using the tenant cryptographic key obtained at block 304 (FIG. 3A) to produce the tenant encrypted data 416. In accordance with the present disclosure, the encryption can use a fixed, constant-valued tweak value; e.g., a cluster UUID, etc. In some embodiments, the fixed tweak value can be the same for all tenants in the multi-tenant storage system 100. In other embodiments, the fixed tweak value can vary from one tenant to another, but be the same for all data from a given tenant.

At block 330, the multi-tenant manager 102 can generate compressed cryptographic data 404. In some embodiments, for example, the multi-tenant manager 102 can add a signature 418 to the tenant encrypted data 416. The signature 418 can be any hard-coded non-zero value. As indicated above, in some embodiments the signature 418 can be a two-byte datum. The multi-tenant manager 102 can additionally append a size value to the size field 420 that represents the size (e.g., in bytes) of the tenant encrypted data 416. As indicated above, in some embodiments the size field 420 can be a two-byte datum. Zero-padding can be added (e.g., "0" bytes) to bring the size of the resulting compressed cryptographic data 404 up to the size of the original clear text data 402 (e.g., 4 KB). The cryptographic data 404 is "compressed" in that the underlying clear text data 402 is compressible. Processing can then continue at block 308 in FIG. 3A.

At block 332, in response to a determination at block 322 that the clear text data is not compressible, the multi-tenant manager 102 can encrypt the clear text data using the tenant cryptographic key to produce uncompressed cryptographic data. In accordance with the present disclosure, the encryption can use a fixed, constant-valued tweak value; e.g., a cluster UUID, etc. In some embodiments, the fixed tweak value can be the same for all tenants in the multi-tenant storage system 100. In other embodiments, the fixed tweak value can vary from one tenant to another, but be the same for all data from a given tenant. The cryptographic data is "uncompressed" in that the underlying clear text data is uncompressible. Processing can then continue at block 308 in FIG. 3A. It is noted herein that the uncompressed cryptographic data may or may not be compressible, but is nonetheless referred to as compressible cryptographic data at block 308 in FIG. 3A.

For the purposes of the present disclosure, this concludes the discussion of processing a write request to store data in the multi-tenant data store 106 in accordance with some embodiments of the present disclosure.

Figure 5:
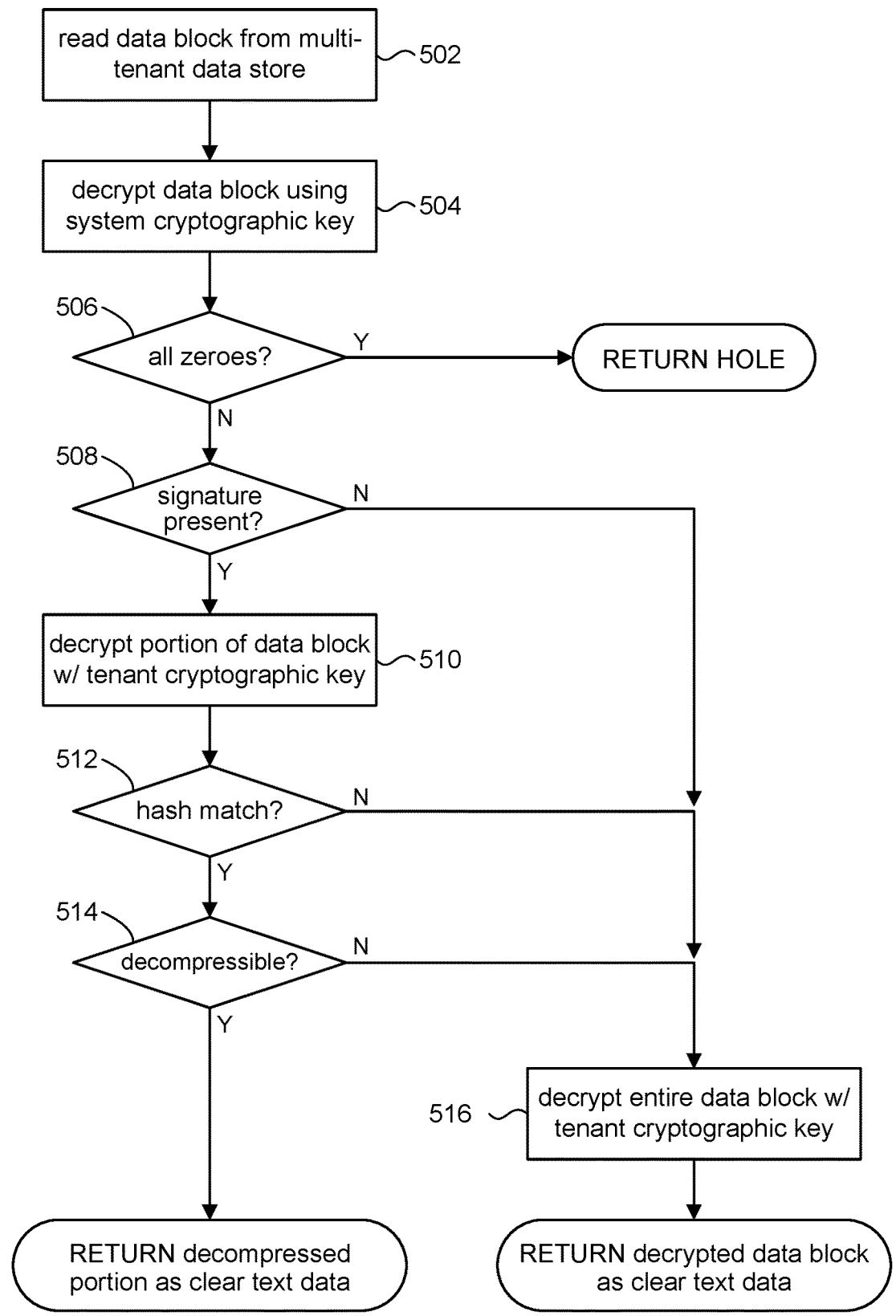
FIG. 5 is a process flow for reading data in multi-tenant storage system in accordance with the present disclosure.

Referring to FIG. 5, the discussion will now turn to a description of reading data from the multi-tenant data store 106 in accordance with some embodiments. FIG. 5 shows an operational flow in the multi-tenant manager 102 for reading multi-tenant data from a multi-tenant data store 106 in accordance with the present disclosure. In some embodiments, for example, the multi-tenant manager 102 can include computer executable program code, which when executed by one or more computer systems (e.g., 202, FIG. 2), can cause operations shown in FIG. 5 to be performed, for example, in a tenant service module 102a of the multi-tenant manager 102. The operations described below are not necessarily executed in the order shown, and can be allocated for execution among one or more concurrently executing processes and/or threads in a computer system, or among two or more computer systems.

At block 502, the multi-tenant manager 102 can read out a data block from the multi-tenant data store 106, for example, in response to a read request from a user/storage tenant. The data that is read out can comprise a cryptographic data written at block 312 (FIG. 3A). The goal of the processing that follows is to produce clear text data from the data block.

At block 504, the multi-tenant manager 102 can decrypt the data block using the system cryptographic key and a tweak value (e.g., sector number that contained the data) to recover the cryptographic data.

At block 506, if the decrypted data block (referred to more simply hereinafter as "data block") contains all zeroes, that can mean the read operation at block 502 read a "hole" in the underlying physical storage devices, and processing of this data block can be deemed complete for the purposes of the present disclosure. Otherwise, the data block is either compressed cryptographic data produced according to blocks 324-330 (FIG. 3B) or uncompressed cryptographic data produced according to block 332 (FIG. 3B). The multi-tenant manager 102 can continue processing to perform a series of tests to determine whether the data block is compressed cryptographic data or uncompressed cryptographic data.

At block 508, the multi-tenant manager 102 can test for the presence of a signature that would be present if the data block is compressed cryptographic data. Referring again to the illustrative example shown in FIG. 4, for instance, the first two bytes in the data block would correspond to the constant-valued signature 418 if the data block is compressed cryptographic data 404. If the signature 418 is not present, the data block can be deemed to be uncompressed cryptographic data (332, FIG. 3B), and processing can continue at block 516. On the other hand, if the two-byte signature 418 is present in the data block, that is not a positive indication that the data block is compressed cryptographic data because there is a 1 in $2^{16}$ chance that the first two bytes in the data block coincidentally happen to look like the signature 418. If the value in the size field 420 is valid (e.g., when the size of the tenant encrypted data 416 is less than the original block size and every byte after this size is a "0" byte), the signature 418 can be considered valid; otherwise, the signature can be considered invalid and processing can continue at block 516. Accordingly, if the signature 418 is found to be valid, processing can continue to block 510 to continue with the next test.

At block 510, the multi-tenant manager 102 can perform a decryption operation on a portion of the data block (tenant encrypted data) in order to continue with the next test. Referring again to the illustrative example shown in FIG. 4, if the data block is compressed cryptographic data 404 then the next two bytes in the data block following the signature 418 would correspond to the size (n) of the tenant encrypted data 416 contained in the size field 420, and the following n bytes in the data block would correspond to the tenant encrypted data 416 itself. Accordingly, in order to proceed to the next test, the multi-tenant manager 102 can read out n bytes following the size field 420, and perform a decryption operation on the n bytes using the tenant cryptographic key associated with the user/storage tenant who made the read request to produce n-byte decrypted text. Processing can continue to block 512 to test the n-byte decrypted text.

At block 512, the multi-tenant manager 102 can test for the presence of a proper hash value in the n-byte decrypted text. Referring to the illustrative example shown in FIG. 4, if the data block is compressed cryptographic data 404 then the n-byte decrypted text produced at block 510 would comprise a hash value 414 and compressed data 412. More specifically, the first 32 bytes in the n-byte decrypted text would correspond to the hash value 414 and the following (n−32) bytes in the n-byte decrypted text would correspond to the compressed data 412. Accordingly, the multi-tenant manager 102 can apply the hash function to the (n−32) bytes of data, and compare the resulting 32-byte hash value to the first 32 bytes of data in the n-byte decrypted text. If the hash values do not match, the data block can be deemed to be uncompressed cryptographic data, and processing can continue at block 516. On the other hand, if the hash values match, in some embodiments, it can be assumed at this point that the decrypted data block produced at block 504 is compressed cryptographic data (e.g., 404, FIG. 4) since there is a very slight chance (e.g., 1 in $2^{8 \times 32}$) that the first 32 bytes in the n-byte decrypted text coincidentally happens to match the computed hash value of the (n−32) bytes of data.

At block 514, the multi-tenant manager 102 can perform a decompression operation on the (n−32) byte portion of the n-byte decrypted text. Assuming that the decrypted data block produced at block 504 is compressed cryptographic data (e.g., 404, FIG. 4), the (n−32) byte portion of the n-byte decrypted text would be the compressed data 412, and the decompression operation would result in the desired clear text data. As a final test, however, if the size of the output of the decompression operation is not 4 KB (the size of the clear text data 402, FIG. 4), then in some embodiments processing can proceed to block 516 under the assumption that the decrypted data block produced at block 504 is uncompressed cryptographic data. On the other hand, if the size of the output of the decompression operation is equal to 4 KB, then the multi-tenant manager 102 can return that output as clear text data.

At block 516, the multi-tenant manager 102 has determined that the decrypted data block produced at block 504 is uncompressed cryptographic data. Recall from block 332 in FIG. 3B that uncompressed cryptographic data is produced by encrypting the received clear text data using the tenant cryptographic key and a fixed-value tweak value. Accordingly, the multi-tenant manager 102 can recover the clear text data from the decrypted data block by decrypting the data block using the appropriate tenant cryptographic key (e.g., obtained from the key manager server 104) and the appropriate fixed-value tweak value, and return the decrypted data block as clear text data.

The discussion will now turn to a description of checksum processing in accordance with the present disclosure. The reading or writing data can introduce errors such as toggled, missing or duplicated bits. Errors can arise during the actual transfer of data with the physical storage media. As a result, the data read back might not be identical to the data written. Checksums are one technique used to improve the integrity of data portions for data storage by detecting and correcting such errors. A checksum is basically a calculated summary of such a data portion. When writing out data, the process can calculate a checksum of the data, which is stored together with the data. When reading back data, the process can calculate the checksum of the received data. If the calculated checksum does not match the stored checksum, an error can be deemed to have occurred, and depending on whether other copies of the data are available elsewhere (in case of the block is replicated in RAID-1 or mirroring) or can be rebuilt by other data and erase coding (in case of the block is stored in RAID-5, RAID-6, or other more generic erasure coding schema), other related data can be used to correct the error.

Figure 6:
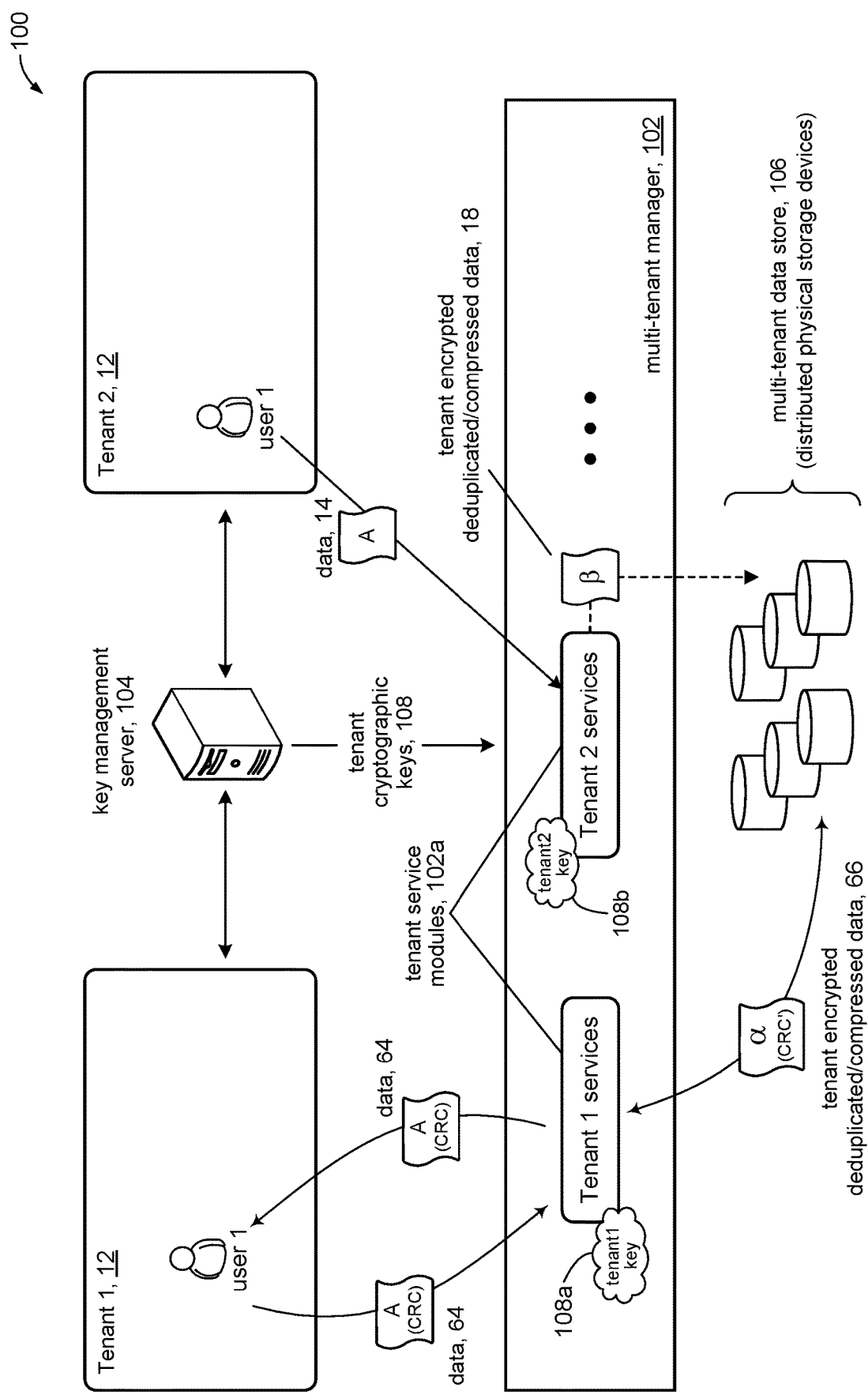
FIG. 6 is a system diagram to illustrate end-to-end checksum in a multi-tenant storage system in accordance with the present disclosure.

FIG. 6 shows the provisioning of end-to-end checksums in multi-tenant storage system 100 in accordance with the present disclosure. In various embodiments, the multi-tenant manager 102 can be configured to support checksum processing that operates in conjunction with multi-tenant encryption of tenant data to improve storage reliability in the multi-tenant data store 106. For example, FIG. 6 shows that a user (e.g., user 1 of Tenant 1) can read and write data 64, using a checksum (CRC) that is computed from the clear text data to detect and repair errors in the clear text data. In accordance with the present disclosure, the multi-tenant manager 102 can generate tenant encrypted data 66 (encrypted using the user's tenant cryptographic key) that includes a separate checksum (CRC') in order to detect and repair errors without the need to access the user's tenant cryptographic key.

Figure 7A:
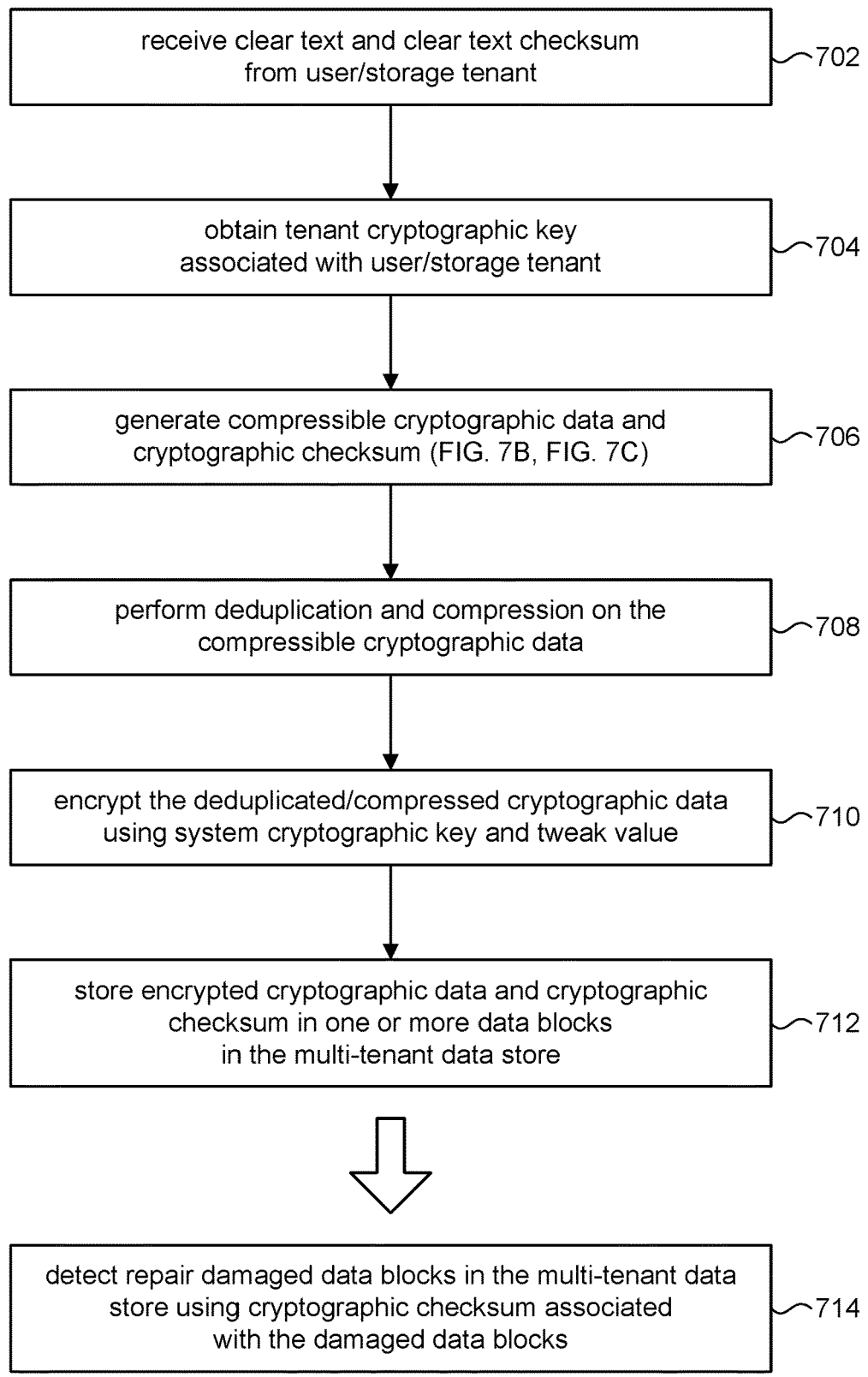
FIGS. 7A, 7B, and 7C are process flows for writing data that preserves end-to-end checksums in a multi-tenant storage system in accordance with the present disclosure.

FIG. 7A shows an operational flow in the multi-tenant manager 102 in accordance with the present disclosure for storing multi-tenant data with end-to-end checksums in a multi-tenant data store 106. In some embodiments, for example, the multi-tenant manager 102 can include computer executable program code, which when executed by one or more computer systems (e.g., 202, FIG. 2), can cause operations shown in FIG. 7A to be performed, for example, in a tenant service module 102a of the multi-tenant manager 102. The operations described below are not necessarily executed in the order shown, and can be allocated for execution among one or more concurrently executing processes and/or threads in a computer system, or among two or more computer systems.

At block 702, the multi-tenant manager 102 can receive a write request from a user/storage tenant 12 comprising data to be stored in the multi-tenant data store 106. The received data can be referred to as clear text data. The write request can also include a checksum computed from the clear text data, referred to as the clear text checksum.

At block 704, the multi-tenant manager 102 can obtain the tenant cryptographic key 108 that is associated with the user/storage tenant 12. In some embodiments, the multi-tenant manager 102 can communicate with the key manager server 104 to obtain the tenant cryptographic key 108 ("cryptokey"). For example, the multi-tenant manager 102 may identify the particular user/storage tenant 12 from the write request, and use that identity to obtain the tenant cryptographic key 108 from the key manager server 104.

At block 706, the multi-tenant manager 102 can generate compressible cryptographic data ("cryptodata") using the tenant cryptographic key 108 obtained at block 704. In accordance with the present disclosure, the multi-tenant manager 102 can further generate a cryptographic checksum ("cryptochecksum") computed from the compressible cryptographic data. Details are described in FIG. 7B.

At block 708, the multi-tenant manager 102 can perform deduplication and compression on the compressible cryptographic data generated at block 706.

At block 710, the multi-tenant manager 102 can encrypt the deduplicated/compressed cryptographic data just before writing it to the multi-tenant data store 106. In some embodiments, the cryptographic checksum can also be encrypted. In accordance with the present disclosure, the multi-tenant manager 102 can perform the encryption using a system cryptographic key and a tweak value that are maintained and managed by the multi-tenant manager 102. In some embodiments, the encryption can be performed in accordance with the Advanced Encryption Standard (AES), although it will be appreciated that any suitable encryption technique can be used. The tweak value can be based on the sector number of the data block in the physical storage devices of the multi-tenant data store 106 into which the encrypted cryptographic data will be stored. The tweak value ensures that no two blocks of data in the physical storage devices will be encrypted in the same way by "tweaking" the system cryptographic key on a per data block basis. In instances where the deduplicated/compressed cryptographic data spans multiple data blocks, the tenant manager 102 can partition the deduplicated/compressed cryptographic data, and encrypt each partition using the system cryptographic key and a tweak value that varies depending on where in the multi-tenant data store 106 the encrypted partition will be stored.

At block 712, the multi-tenant manager 102 can store the encrypted cryptographic data in one or more data blocks in the multi-tenant data store 106. For the purposes of the present disclosure, processing of the write request from the user/storage tenant can be deemed complete at this point.

At block 714, the multi-tenant manager 102 can detect and repair damaged data blocks in the multi-tenant data store 106 using the cryptographic checksum. Since the detection and repair operations use the cryptographic checksum, rather than the clear text checksum, the activity can proceed absent access to any of the tenants' cryptographic keys in the key manager server 104. By comparison, error detection and repair in a conventional multi-tenant system requires access the tenants' cryptographic keys in order to decrypt the data to obtain the clear text checksum. Accordingly, the error detection and repair process is tied to availability of the key management server 104. On the other hand, since the cryptographic checksum in embodiments of the present disclosure is not a function of the tenant cryptographic key, the detection and repair activity does not rely on having access to the key manager server 104 thus allowing for improvements in achieving data reliability at the physical data storage level in the multi-tenant data store 106. However, detection and repair of errors on the clear text data remains available at the user/storage tenant end because the clear text checksum is preserved.

Figure 7B:
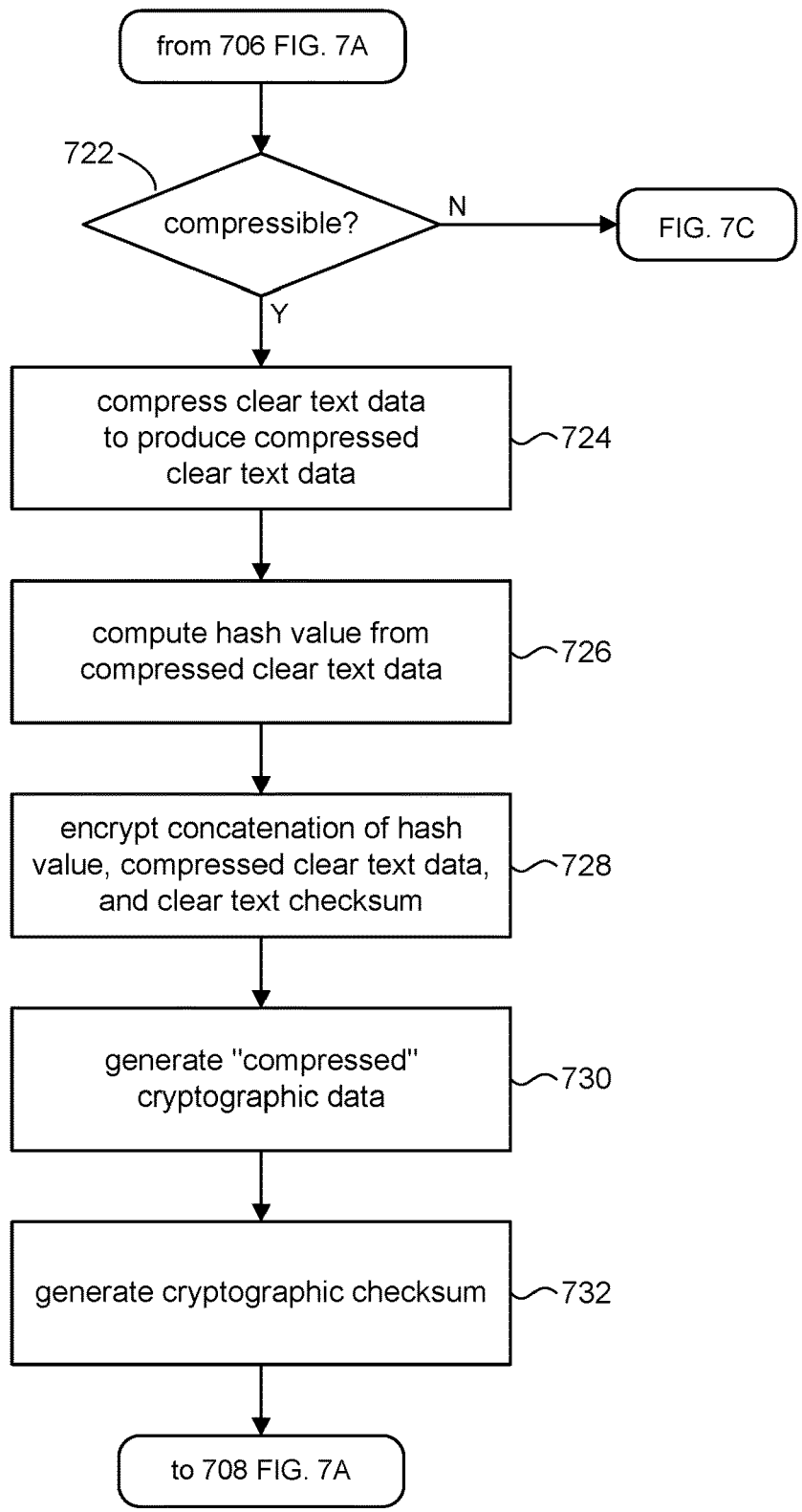
Figure 8:
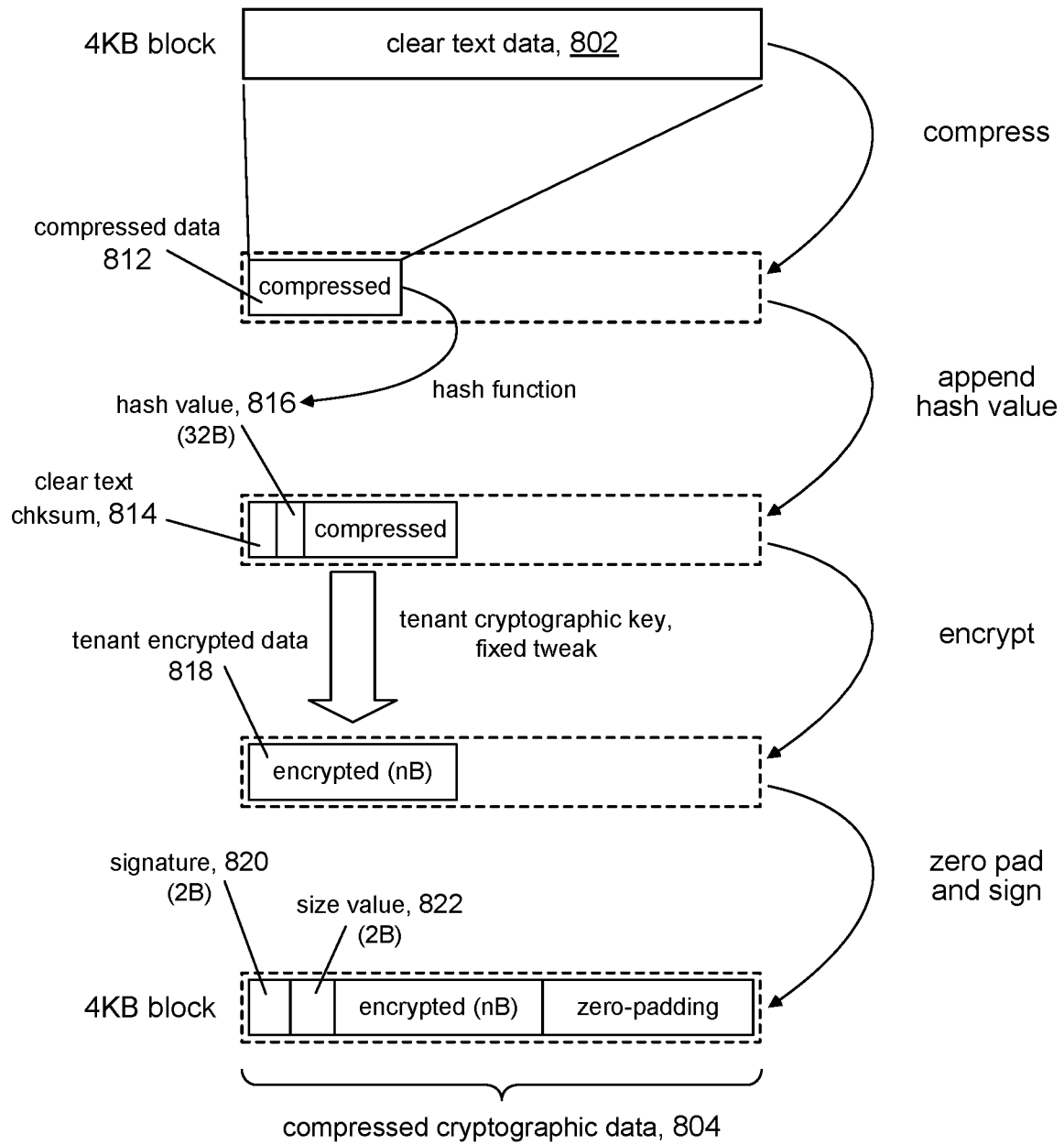
FIG. 8 shows some data manipulations in accordance with the process flows of FIGS. 7A, 7B, and 7C.

Referring to FIGS. 7B and 8, the discussion will now continue with a description of the processing in block 706 to produce compressible cryptographic data. FIGS. 7B and 8 show an operational flow in the multi-tenant manager 102 in accordance with the present disclosure for storing multi-tenant data in a multi-tenant data store 106, and in particular details for generating the compressible cryptographic data using the storage tenant's cryptographic key. In some embodiments, the multi-tenant manager 102 can include computer executable program code, which when executed by one or more computer systems (e.g., 202, FIG. 2), can cause operations shown in FIG. 7B to be performed, for example, in a tenant service module 102a of the multi-tenant manager 102. FIG. 8 illustrates an example of the data that is involved in the processing. The operations described below are not necessarily executed in the order shown, and can be allocated for execution among one or more concurrently executing processes and/or threads in a computer system, or among two or more computer systems.

At block 722, the multi-tenant manager 102 can make a determination whether the clear text data received from the user/storage tenant (block 702, FIG. 7A) is compressible. As explained above, data can be deemed to be compressible if a compression operation can be performed on the data that reduces the size of the data by a predetermined amount. In general, any technique may be used to determine whether the clear text data is compressible. In some embodiments, for example, the determination can be made by running a predetermined compression algorithm on the clear text data. The clear text data can be deemed compressible if the size of the compressed clear text data is less than or equal to the quantity:

C−HeaderSize, where C is a threshold percentage of the size of the uncompressed clear text data (e.g., C can be 2 KB if the uncompressed size is 4 KB), HeaderSize is the combined data size (in bytes) of a checksum value (e.g., 2 B), hash value (e.g., 32 B), a signature (e.g., 2 B), and a size value (e.g., 2 B). These quantities are discussed below.

Processing can proceed to block 724 in response to a determination that the clear text data is compressible. In response to a determination that the clear text data is not compressible, processing can continue with operations set forth in FIG. 7C.

At block 724, the multi-tenant manager 102 can produce compressed clear text data by running a predetermined compression algorithm on the clear text data (if not already done at block 722). The example in FIG. 8 depicts a 4 KB data block of clear text data 802 compressed down to a block of compressed clear text data 812.

At block 726, the multi-tenant manager 102 can compute a hash value 816 from the compressed clear text data using a suitable hashing algorithm. As indicated above, in some embodiments the hash value 816 can be a 32-byte datum.

At block 728, the multi-tenant manager 102 can produce tenant encrypted data 818. In some embodiments, for example, the multi-tenant manager 102 can append the clear text checksum 814 received from the user/storage tenant (block 702, FIG. 7A) and the hash value 816 to the compressed clear text data 812, as illustrated for example in FIG. 8. The multi-tenant manager 102 can then encrypt the concatenation of the clear text checksum 814, the hash value 816, and the compressed clear text data 812 using the obtained tenant cryptographic key (block 704, FIG. 7A) to produce the tenant encrypted data 818. In accordance with the present disclosure, the encryption can use a fixed, constant-valued tweak value; e.g., a cluster UUID, etc. In some embodiments, the fixed tweak value can be the same for all tenants in the multi-tenant storage system 100. In other embodiments, the fixed tweak value can vary from one tenant to another, but be the same for all data from a given tenant.

At block 730, the multi-tenant manager 102 can generate compressed cryptographic data 804. In some embodiments, for example, the multi-tenant manager 102 can append a signature 820 to the tenant encrypted data 818. The signature 820 can be any hard-coded non-zero value. As indicated above, in some embodiments the signature 820 can be a two-byte datum. The multi-tenant manager 102 can additionally append a size value to the size field 822 that represents the size (in bytes) of the tenant encrypted data 818. As indicated above, in some embodiments the size field 822 can be a two-byte datum. Zero-padding can be added to bring the size of the resulting compressed cryptographic data 804 up to the size of the original clear text data 802 (e.g., 4 KB). The cryptographic data is "compressed" in that the underlying clear text data 802 is compressible.

At block 732, the multi-tenant manager 102 can generate a cryptographic checksum for the compressed cryptographic data 804 produced at block 730. Processing can then continue at block 708 in FIG. 7A.

Figure 7C:
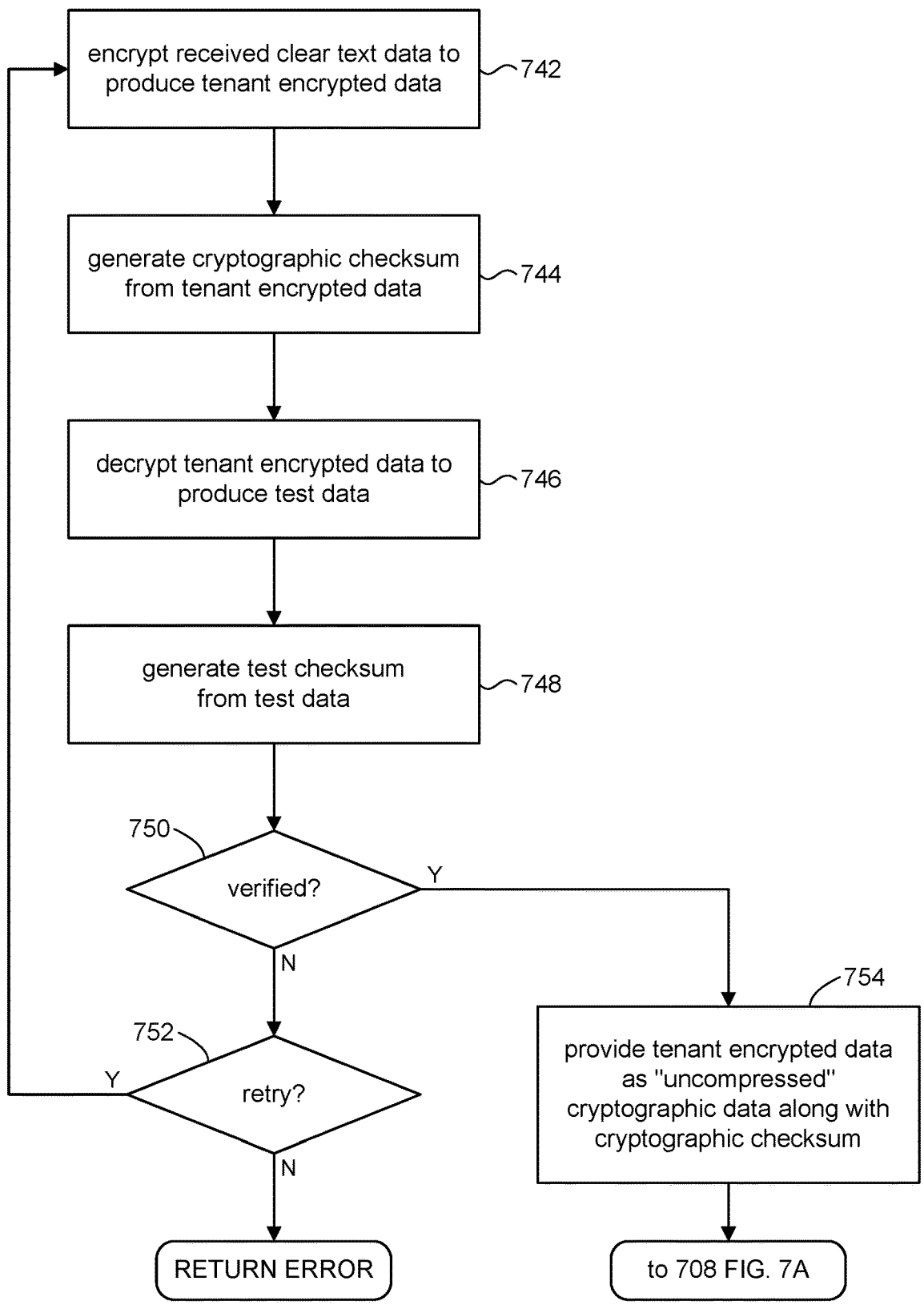

FIG. 7C shows an operational flow in the multi-tenant manager 102 in accordance with the present disclosure for storing multi-tenant data in a multi-tenant data store 106, and in particular details for processing uncompressible clear text data (N branch of block 722, FIG. 7B). In some embodiments, the multi-tenant manager 102 can include computer executable program code, which when executed by one or more computer systems (e.g., 202, FIG. 2), can cause operations shown in FIG. 7C to be performed, for example, in a tenant service module 102a of the multi-tenant manager 102. The operations described below are not necessarily executed in the order shown, and can be allocated for execution among one or more concurrently executing processes and/or threads in a computer system, or among two or more computer systems.

At block 742, the multi-tenant manager 102 can encrypt the uncompressible clear text data using the tenant cryptographic key received from the user/storage tenant (block 704, FIG. 7A) to produce tenant encrypted data. In accordance with the present disclosure, the encryption can use a fixed, constant-valued tweak value; e.g., a cluster UUID, etc. In some embodiments, the fixed tweak value can be the same for all tenants in the multi-tenant storage system 100. In other embodiments, the fixed tweak value can vary from one tenant to another, but be the same for all data from a given tenant.

At block 744, the multi-tenant manager 102 can generate a cryptographic checksum for the tenant encrypted data produced. The remaining operations relate set forth a verification process in accordance with some embodiments. Since the received clear text data is not compressible, the received clear text checksum cannot be retained in the multi-tenant data store 106 and will be discarded. In accordance with the present disclosure, the multi-tenant manager 102 can verify the encryption performed in block 742 to verify that no random memory corruptions or other errors occurred during the encryption. The discarded clear text checksum can then be recomputed when the data is read out, which is discussed below.

At block 746, the multi-tenant manager 102 can begin the verification process by decrypting the tenant encrypted data to produce test data.

At block 748, the multi-tenant manager 102 can generate a test checksum by computing the checksum of the test data.

At block 750, the multi-tenant manager 102 can compare the test data against the received clear text data and compare the test checksum against the received clear text checksum, to verify the encryption process in block 742. If the comparisons pass, then processing can proceed to block 754. Otherwise, processing can proceed to block 752.

At block 752, the multi-tenant manager 102 can return to block 742 to retry the encryption process. In some embodiments, some predetermined number of retries can be performed before returning an ERROR indication. In some embodiments, the number of retries may be the same for all storage tenants, and in other embodiments the number of retries may vary from one storage tenant to another.

At block 754, the multi-tenant manager 102 can return the tenant encrypted data as uncompressed cryptographic data, along with the cryptographic checksum from block 744. The cryptographic data is "uncompressed" in that the underlying clear text data is uncompressible. Processing can then continue at block 708 in FIG. 7A. It is noted herein that the uncompressed cryptographic data may or may not be compressible, but is nonetheless referred to as compressible cryptographic data at block 708 in FIG. 7A.

This concludes the discussion of processing checksums when processing a write request to store data in the multi-tenant data store 106 in accordance with some embodiments of the present disclosure. The discussion will now turn to a description of processing checksums when reading data from the multi-tenant data store 106 in accordance with some embodiments.

Figure 9A:
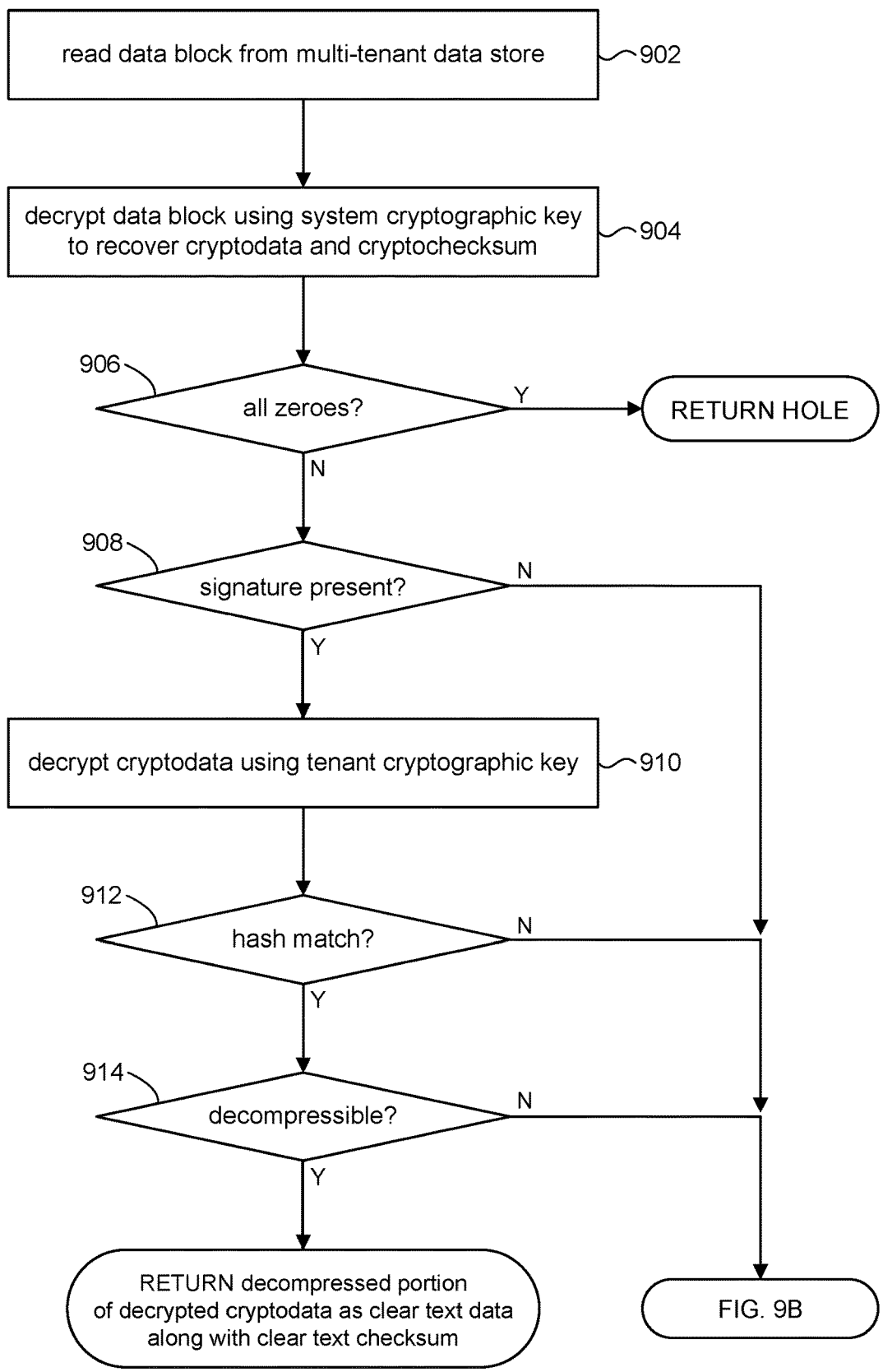
FIGS. 9A and 9B are process flows for reading data that preserves end-to-end checksums in multi-tenant storage system in accordance with the present disclosure.

FIG. 9A shows an operational flow in the multi-tenant manager 102 in accordance with the present disclosure for processing checksums when reading multi-tenant data from a multi-tenant data store 106. In some embodiments, for example, the multi-tenant manager 102 can include computer executable program code, which when executed by one or more computer systems (e.g., 202, FIG. 2), can cause operations shown in FIG. 9A to be performed, for example, in a tenant service module 102a of the multi-tenant manager 102. The operations described below are not necessarily executed in the order shown, and can be allocated for execution among one or more concurrently executing processes and/or threads in a computer system, or among two or more computer systems.

At block 902, the multi-tenant manager 102 can read out a data block from the multi-tenant data store 106, for example, in response to a read request from a user/storage tenant. The data block that is read out may include a cryptographic data portion and a cryptographic checksum portion that were written at block 712 (FIG. 7A). The goal of the processing that follows is to produce clear text data and a clear text checksum from the data block.

At block 904, the multi-tenant manager 102 can decrypt the data block using the system cryptographic key and a tweak value (e.g., the sector number that contained the data) to recover the cryptographic data portion and the cryptographic checksum portion.

At block 906, if the decrypted data block contains all zeroes, that can mean the read operation at block 902 read a "hole" in the underlying physical storage devices, and processing of this data block can be deemed complete. Otherwise, the cryptographic data portion (referred to herein simply as "cryptodata") is either compressed cryptographic data produced according to blocks 724-730 (FIG. 7B) or uncompressed cryptographic data produced according to FIG. 7C. The multi-tenant manager 102 can continue processing to perform a series of tests to determine whether the cryptodata is compressed cryptographic data or uncompressed cryptographic data.

At block 908, the multi-tenant manager 102 can test for the presence of a signature that would be present if the cryptodata is compressed cryptographic data. Referring again to the illustrative example shown in FIG. 8, for instance, the first two bytes in the cryptodata would correspond to the constant-valued signature 820 if the cryptodata is compressed cryptographic data 804. If the signature 820 is not present, the cryptodata can be deemed to be uncompressed cryptographic data (block 754, FIG. 7C), and processing can continue in accordance with FIG. 9B. On the other hand, if the two-byte signature 820 is present in the cryptodata, that is not a positive indication that the cryptodata is compressed cryptographic data because there is a 1 in $2^{16}$ chance that the first two bytes in the cryptodata coincidentally happen to look like the signature 820. If the value in the size field 822 is valid (e.g., when the size of the tenant encrypted data 818 is less than the original block size and every byte after this size is a "0" byte), the signature 820 can be considered valid; otherwise, the signature can be considered invalid and processing can proceed at FIG. 9B. Accordingly, if the signature 820 is found to be valid, processing can continue to block 910 to continue with the next test.

At block 910, the multi-tenant manager 102 can perform a decryption operation on a portion of the cryptodata (tenant encrypted data) in order to continue with the next test. Referring again to the illustrative example shown in FIG. 8, if the cryptodata is compressed cryptographic data 804 then the next two bytes in the cryptodata following the signature 820 would correspond to the size (n) of the tenant encrypted data 818 contained in the size field 822, and the following n bytes in the cryptodata would correspond to the tenant encrypted data 818 itself. Accordingly, in order to proceed to the next test, the multi-tenant manager 102 can read out n bytes following the size value 822, and perform a decryption operation on the n bytes using the tenant cryptographic key associated with the user/storage tenant who made the read request to produce n-byte decrypted text. Processing can continue to block 912 to test the n-byte decrypted text.

At block 912, the multi-tenant manager 102 can test for the presence of a proper hash value in the n-byte decrypted text. Referring to the illustrative example shown in FIG. 8, if the cryptodata is compressed cryptographic data 804 then the n-byte decrypted text produced at block 910 would comprise a checksum, a hash value, and compressed data. More specifically, the first two bytes in the n-byte decrypted text would correspond to the clear text checksum 814, the next 32 bytes would correspond to the hash value 816, and the remaining (n−32) bytes in the n-byte decrypted text would correspond to the compressed data 812. Accordingly, the multi-tenant manager 102 can apply the hash function to the (n−32) bytes of data, and compare the resulting 32-byte hash value to the 32 bytes of data in the n-byte decrypted text that would correspond to the hash value 816. If the hash values do not match, the cryptodata can be deemed to be uncompressed cryptographic data, and processing can continue in accordance with FIG. 9B. On the other hand, in some embodiments, it can be assumed at this point that the cryptodata produced at block 904 is compressed cryptographic data (e.g., 804, FIG. 8) since there is a very slight chance (e.g., 1 in $2^{8 \times 32}$) that the first 32 bytes in the n-byte decrypted text coincidentally happens to match the computed hash value of the (n−32) bytes of data.

At block 914, the multi-tenant manager 102 can perform a decompression operation on the (n−32) byte portion of the n-byte decrypted text. Assuming that the cryptodata produced at block 904 is compressed cryptographic data (e.g., 804, FIG. 8), the (n−32) byte portion of the n-byte decrypted text would be the compressed data 812, and the decompression operation would result in the desired clear text data. As a final test however, if the size of the output of the decompression operation is not 4 KB (FIG. 8), then in some embodiments processing can proceed in accordance with FIG. 9B under the assumption that the cryptodata produced at block 904 is uncompressed cryptographic data. In other embodiments (not shown), the multi-tenant manager 102 can return an error code. On the other hand, if the size of the output of the decompression operation is equal to 4 KB, then the multi-tenant manager 102 can return that output as clear text data, along with the clear text checksum 814. Since the cryptographic checksum is used to detect and repair data in the multi-tenant data store 106 (block 714, FIG. 7A), it can be discarded.

Figure 9B:
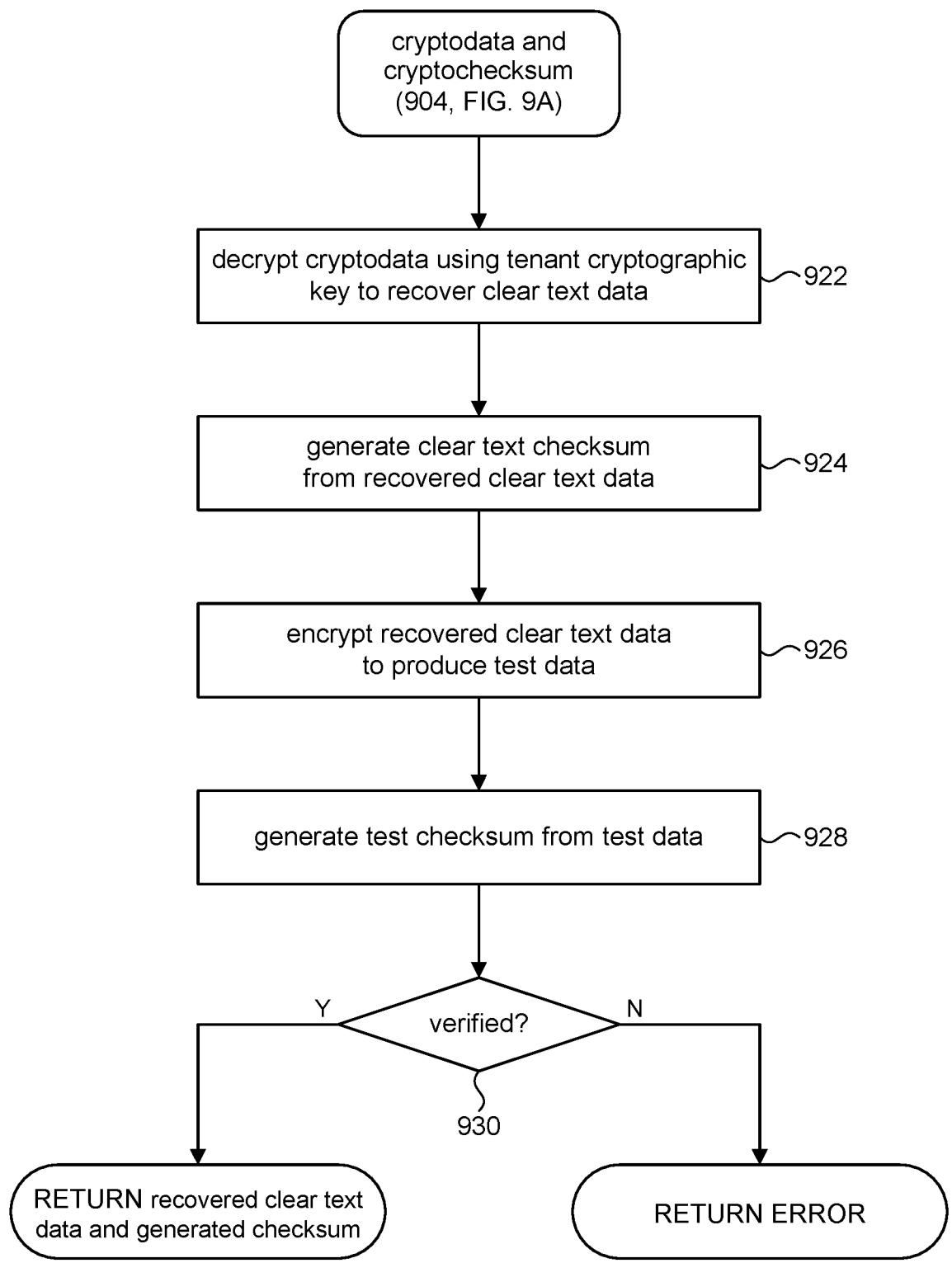

FIG. 9B shows an operational flow in the multi-tenant manager 102 in accordance with the present disclosure for processing checksums for uncompressed cryptographic data. In some embodiments, for example, the multi-tenant manager 102 can include computer executable program code, which when executed by one or more computer systems (e.g., 202, FIG. 2), can cause operations shown in FIG. 9B to be performed, for example, in a tenant service module 102a of the multi-tenant manager 102. The operations described below are not necessarily executed in the order shown, and can be allocated for execution among one or more concurrently executing processes and/or threads in a computer system, or among two or more computer systems.

At block 922, the multi-tenant manager 102 has determined that the cryptodata produced at block 904 (FIG. 9A) is uncompressed cryptographic data. Recall from block 754 in FIG. 7C that the uncompressed cryptographic data is produced by encrypting the received clear text data using the tenant cryptographic key and the fixed-value tweak value. Accordingly, the multi-tenant manager 102 can recover the clear text data from the cryptodata by decrypting the cryptodata using the appropriate tenant cryptographic key (e.g., from the key manager server 104) and appropriate fixed-value tweak value.

At block 924, the multi-tenant manager 102 can recompute the clear text checksum, that was discarded during the processing of uncompressible clear text data described in FIG. 7C, from the clear text data recovered at block 922.

At block 926, the multi-tenant manager 102 can verify the decryption performed at block 922. In some embodiments, for example, the multi-tenant manager 102 can encrypt the recovered clear text data using the tenant cryptographic key and a tweak value to produce test data. In various embodiments, any tweak value can be used.

At block 928, the multi-tenant manager 102 can generate a test checksum from the test data.

At block 930, the multi-tenant manager 102 can verify the decryption process by comparing the test data with the cryptographic data obtained at block 904 (FIG. 9A) and the test checksum with the cryptographic checksum also obtained from block 904. If the comparisons pass, then the multi-tenant manager 102 can return the recovered cleat text and the generated clear text checksum. Otherwise, the multi-tenant manager 102 can return an ERROR indication.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system-computer readable media may be based on any existing or subsequently developed technology for embodying computer programs in a manner that enables them to be read by a computer. Examples of a non-transitory computer readable medium include a hard drive, solid state drive, NVMe drive, phase change memory or other non-volatile memory device, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a multi-tenant storage system, the method comprising:
   receiving clear text data and a clear text checksum of the clear text data from a user that is associated with a first storage tenant among a plurality of storage tenants in the multi-tenant storage system;
   obtaining a tenant cryptokey associated with the first storage tenant;
   when the clear text data is compressible:
      generating first cryptodata including encrypting a concatenation of compressed clear text data and the clear text checksum using the tenant cryptokey;
      generating a first cryptochecksum from the first cryptodata; and storing the first cryptodata and the first cryptochecksum in the multi-tenant storage system, wherein the clear text checksum is contained in the first cryptodata; and when the clear text data is not compressible:
generating second cryptodata including encrypting the clear text data using the tenant cryptokey;
generating a second cryptochecksum from the second cryptodata;
verifying the second cryptodata by decrypting the second cryptodata, and comparing the decrypted second cryptodata with the clear text data; and
storing the second cryptodata and the second cryptochecksum in the multi-tenant storage system, wherein the second cryptodata and the second cryptochecksum are absent the clear text checksum; and
repairing damaged cryptodata stored in the multi-tenant storage system using cryptochecksums associated with the damaged cryptodata, absent access to any tenant cryptographic keys used to encrypt the clear text data contained in the damaged cryptodata.

2. The method of claim 1, further comprising verifying the second cryptochecksum by generating a checksum from the decrypted second cryptodata and comparing the generated checksum with the clear text checksum.

3. The method of claim 1, wherein storing the first cryptodata and the first cryptochecksum in the multi-tenant storage system comprises: encrypting the first cryptodata using a system cryptographic key to produce system-encrypted cryptographic data; and storing the system-encrypted cryptographic data and the first cryptochecksum in the multi-tenant storage system.

4. The method of claim 1, wherein storing the second cryptodata and the second cryptochecksum in the multi-tenant storage system comprises: encrypting the second cryptodata using a system cryptographic key to produce system-encrypted cryptographic data; and storing the system-encrypted cryptographic data and the second cryptochecksum in the multi-tenant storage system.

5. The method of claim 1, wherein generating first cryptodata further comprises computing a hash value of the compressed clear text data and encrypting a concatenation of the clear text checksum, the hash value, and the compressed clear text data using the obtained tenant cryptographic key to produce the tenant encrypted data.

6. The method of claim 1, wherein the steps of encrypting include using a constant-valued tweak value.

7. The method of claim 1, further comprising reading the first cryptodata from the multi-tenant storage system and recovering the clear text checksum by decrypting the first cryptodata.

8. The method of claim 1, further comprising reading the second cryptodata from the multi-tenant storage system and recovering the clear text checksum by decrypting the second cryptodata to recover the clear text data and computing a checksum from the recovered clear text data.

9. The method of claim 1, further comprising:
reading a data block from the multi-tenant storage system comprising a cryptographic data portion and a cryptographic checksum portion; and
verifying the block of data when a predetermined data signature is absent from the cryptographic data portion, including:
generating recovered clear text data by decrypting the cryptographic data portion using a tenant cryptographic key of a storage tenant associated with the block of data to;
generating a recovered clear text checksum from the recovered clear text data;
encrypting the recovered clear text data to produce encrypted test data;
generating a test checksum from the encrypted test data; and
signaling an error indication when the encrypted test data does not match the cryptographic data portion of the data block or when the test checksum does not match the cryptographic checksum portion of the data block.

10. A non-transitory computer-readable storage medium having stored thereon computer executable instructions, which when executed by a computer device, cause the computer device to:
receive clear text data and a clear text checksum of the clear text data from a user that is associated with a first storage tenant among a plurality of storage tenants in the multi-tenant storage system;
obtain a tenant cryptokey associated with the first storage tenant;
when the clear text data is compressible, then:
generate first cryptodata including encrypting a concatenation of compressed clear text data and the clear text checksum using the tenant cryptokey;
generate a first cryptochecksum from the first cryptodata; and
store the first cryptodata and the first cryptochecksum in the multi-tenant storage system, wherein the clear text checksum is contained in the first cryptodata; and
when the clear text data is not compressible, then:
generate second cryptodata including encrypting the clear text data using the tenant cryptokey;
generate a second cryptochecksum from the second cryptodata;
verify the second cryptodata by decrypting the second cryptodata, and comparing the decrypted second cryptodata with the clear text data; and
store the second cryptodata and the second cryptochecksum in the multi-tenant storage system, wherein the second cryptodata and the second cryptochecksum are absent the clear text checksum; and
repair damaged cryptodata stored in the multi-tenant storage system using cryptochecksums associated with the damaged cryptodata, absent access to any tenant cryptographic keys used to encrypt the clear text data contained in the damaged cryptodata.

11. The non-transitory computer-readable storage medium of claim 10, wherein the computer executable instructions, which when executed by the computer device, further cause the computer device to verify the second cryptochecksum by generating a checksum from the decrypted second cryptodata and comparing the generated checksum with the clear text checksum.

12. The non-transitory computer-readable storage medium of claim 10, wherein storing the first cryptodata and the first cryptochecksum in the multi-tenant storage system comprises: encrypting the first cryptodata using a system cryptographic key to produce system-encrypted cryptographic data; and storing the system-encrypted cryptographic data and the first cryptochecksum in the multi-tenant storage system.

13. The non-transitory computer-readable storage medium of claim 10, wherein storing the second cryptodata and the second cryptochecksum in the multi-tenant storage system comprises: encrypting the second cryptodata using a system cryptographic key to produce system-encrypted cryptographic data; and storing the system-encrypted cryptographic data and the second cryptochecksum in the multi-tenant storage system.

14. The non-transitory computer-readable storage medium of claim 10, wherein generating first cryptodata further comprises computing a hash value of the compressed clear text data and encrypting a concatenation of the clear text checksum, the hash value, and the compressed clear text data using the obtained tenant cryptographic key to produce the tenant encrypted data.

15. The non-transitory computer-readable storage medium of claim 10, wherein the computer executable instructions, which when executed by the computer device, further cause the computer device to read the first cryptodata from the multi-tenant storage system and recovering the clear text checksum by decrypting the first cryptodata.

16. The non-transitory computer-readable storage medium of claim 10, wherein the computer executable instructions, which when executed by the computer device, further cause the computer device to read the second cryptodata from the multi-tenant storage system and recovering the clear text checksum by decrypting the second cryptodata to recover the clear text data and computing a checksum from the recovered clear text data.

17. An apparatus comprising:
one or more computer processors; and
a computer-readable storage medium comprising instructions for controlling the one or more computer processors to be operable to:
receive clear text data and a clear text checksum of the clear text data from a user that is associated with a first storage tenant among a plurality of storage tenants in the multi-tenant storage system;
obtain a tenant cryptokey associated with the first storage tenant;
when the clear text data is compressible, then:
generate first cryptodata including encrypting a concatenation of compressed clear text data and the clear text checksum using the tenant cryptokey;
generate a first cryptochecksum from the first cryptodata; and
store the first cryptodata and the first cryptochecksum in the multi-tenant storage system, wherein the clear text checksum is contained in the first cryptodata; and
when the clear text data is not compressible, then:
generate second cryptodata including encrypting the clear text data using the tenant cryptokey;
generate a second cryptochecksum from the second cryptodata;
verify the second cryptodata by decrypting the second cryptodata, and comparing the decrypted second cryptodata with the clear text data; and
store the second cryptodata and the second cryptochecksum in the multi-tenant storage system, wherein the second cryptodata and the second cryptochecksum are absent the clear text checksum; and
repair damaged cryptodata stored in the multi-tenant storage system using cryptochecksums associated with the damaged cryptodata, absent access to any tenant cryptographic keys used to encrypt the clear text data contained in the damaged cryptodata.

18. The apparatus of claim 17, wherein the computer-readable storage medium further comprises instructions for controlling the one or more computer processors to be operable to verify the second cryptochecksum by generating a checksum from the decrypted second cryptodata and comparing the generated checksum with the clear text checksum.

19. The apparatus of claim 17, wherein generating first cryptodata further comprises computing a hash value of the compressed clear text data and encrypting a concatenation of the clear text checksum, the hash value, and the compressed clear text data using the obtained tenant cryptographic key to produce the tenant encrypted data.

20. The apparatus of claim 17, wherein the computer-readable storage medium further comprises instructions for controlling the one or more computer processors to be operable to read the first cryptodata from the multi-tenant storage system and recovering the clear text checksum by decrypting the first cryptodata.

* * * * *